United States Patent
Li et al.

(10) Patent No.: US 9,213,827 B2
(45) Date of Patent: Dec. 15, 2015

(54) SECURITY DATA AGGREGATION AND BUSINESS INTELLIGENCE FOR WEB APPLICATIONS

(71) Applicant: Intel Corporation, Santa Clara, CA (US)

(72) Inventors: Hong Li, El Dorado Hills, CA (US); Alan D. Ross, Shingle Springs, CA (US); Rita H. Wouhaybi, Portland, OR (US); Tobias M. Kohlenberg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/628,219

(22) Filed: Sep. 27, 2012

(65) Prior Publication Data

US 2014/0090066 A1    Mar. 27, 2014

(51) Int. Cl.
    *G06F 11/00*      (2006.01)
    *G06F 12/14*      (2006.01)
    *G06F 12/16*      (2006.01)
    *G08B 23/00*      (2006.01)
    *G06F 21/51*      (2013.01)

(52) U.S. Cl.
    CPC ...................................... *G06F 21/51* (2013.01)

(58) Field of Classification Search
    CPC ....................................................... G06F 21/51
    USPC .......................................................... 726/25
    See application file for complete search history.

(56) References Cited

U.S. PATENT DOCUMENTS

| | | | | |
|---|---|---|---|---|
| 5,610,981 | A * | 3/1997 | Mooney et al. | 713/185 |
| 5,774,551 | A * | 6/1998 | Wu et al. | 713/155 |
| 6,275,941 | B1 * | 8/2001 | Saito et al. | 726/2 |
| 6,308,273 | B1 * | 10/2001 | Goertzel et al. | 726/9 |
| 6,408,336 | B1 * | 6/2002 | Schneider et al. | 709/229 |
| 6,691,232 | B1 * | 2/2004 | Wood et al. | 726/6 |
| 6,892,307 | B1 * | 5/2005 | Wood et al. | 726/8 |
| 8,146,133 | B2 * | 3/2012 | Moon et al. | 726/1 |
| 2004/0008652 | A1 * | 1/2004 | Tanzella et al. | 370/338 |
| 2004/0054894 | A1 * | 3/2004 | Lambert | 713/165 |
| 2005/0220306 | A1 * | 10/2005 | Westhoff et al. | 380/270 |
| 2006/0251068 | A1 * | 11/2006 | Judge et al. | 370/389 |

(Continued)

FOREIGN PATENT DOCUMENTS

| | | |
|---|---|---|
| WO | 03/077071 A2 | 9/2003 |
| WO | 2010/123623 A2 | 10/2010 |

OTHER PUBLICATIONS

Ajay Mahimkar; SecureDAV: A Secure Data Aggregation and Verification Protocol for Sensor Networks; Year:2004; IEE; pp. 2175-2179.*

(Continued)

*Primary Examiner* — Monjour Rahim
(74) *Attorney, Agent, or Firm* — Jordan IP Law, LLC

(57) ABSTRACT

Systems and methods may provide for detecting a browser request for web content. Additionally, interaction information associated with a plurality of sources may be determined in response to the browser request, and a risk profile may be generated based on the interaction. The risk profile may include at least a portion of the interaction information as well as recommended control actions to mitigate the identified risk. In one example, the risk profile is presented to a user associated with the browser request as well as to a security control module associated with the platform.

24 Claims, 3 Drawing Sheets

(56) References Cited

U.S. PATENT DOCUMENTS

| | | | |
|---|---|---|---|
| 2008/0049013 A1* | 2/2008 | Nasle | 345/419 |
| 2008/0263627 A1* | 10/2008 | Berteau et al. | 726/1 |
| 2009/0125980 A1* | 5/2009 | Alperovitch et al. | 726/3 |
| 2009/0222925 A1* | 9/2009 | Hilaiel et al. | 726/25 |
| 2010/0257578 A1* | 10/2010 | Shukla et al. | 726/1 |
| 2011/0145926 A1* | 6/2011 | Dalcher et al. | 726/26 |
| 2011/0154497 A1* | 6/2011 | Bailey, Jr. | 726/25 |
| 2011/0208801 A1* | 8/2011 | Thorkelsson et al. | 709/203 |
| 2011/0289308 A1* | 11/2011 | Sobko et al. | 713/100 |
| 2011/0289582 A1* | 11/2011 | Kejriwal et al. | 726/22 |
| 2013/0013548 A1* | 1/2013 | Alexander et al. | 706/47 |
| 2013/0212146 A1* | 8/2013 | Hansknecht | 709/201 |
| 2014/0330759 A1* | 11/2014 | Hegli et al. | 706/12 |

OTHER PUBLICATIONS

International Search Report and Written Opinion for PCT Patent Application No. PCT/US2013/061338, mailed on Jan. 27, 2014, 14 pages.

* cited by examiner

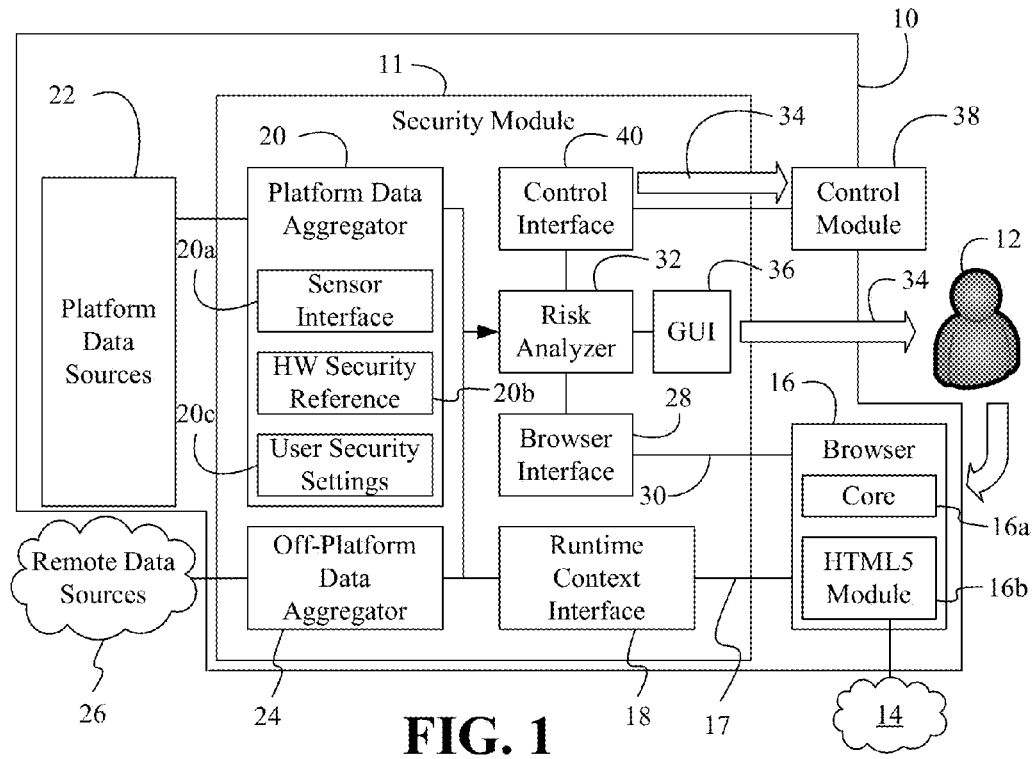
FIG. 1
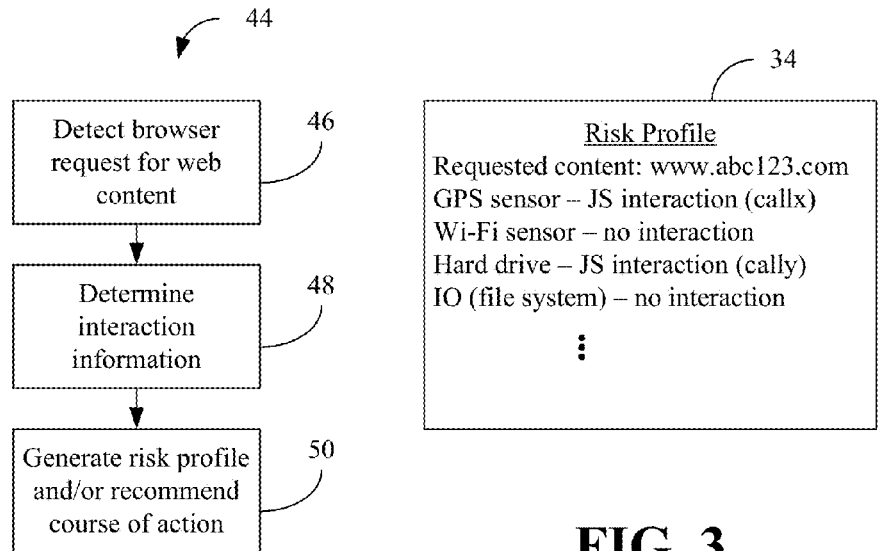
FIG. 2
FIG. 3

SECURITY DATA AGGREGATION AND BUSINESS INTELLIGENCE FOR WEB APPLICATIONS

BACKGROUND

Embodiments generally relate to web based security management. More particularly, embodiments relate to the intelligent aggregation of platform device interaction information associated with web applications.

Emerging markup languages such as HTML5 (Hypertext Markup Language 5, e.g., HTML5 Editor's Draft 8 May 2012, W3C), LLVM (e.g., LLVM 3.1, May 22, 2012, llvm*org), and other runtime or just in time (JIT) environment languages may support more robust multimedia related web platform development. The use of these advanced languages by an application developer, however, may also expose end user platform components such as graphics processors, memory, sensors, and so forth, to web applications, wherein the exposure of such components may lead to security concerns.

BRIEF DESCRIPTION OF THE DRAWINGS

The various advantages of the embodiments described herein will become apparent to one skilled in the art by reading the following specification and appended claims, and by referencing the following drawings, in which:

FIG. 1 is a block diagram of an example of a platform having a security module according to an embodiment;

FIG. 2 is a flowchart of an example of a method of managing web based security risks according to an embodiment;

FIG. 3 is an illustration of an example of a risk profile according to an embodiment;

DETAILED DESCRIPTION

Figure 4:
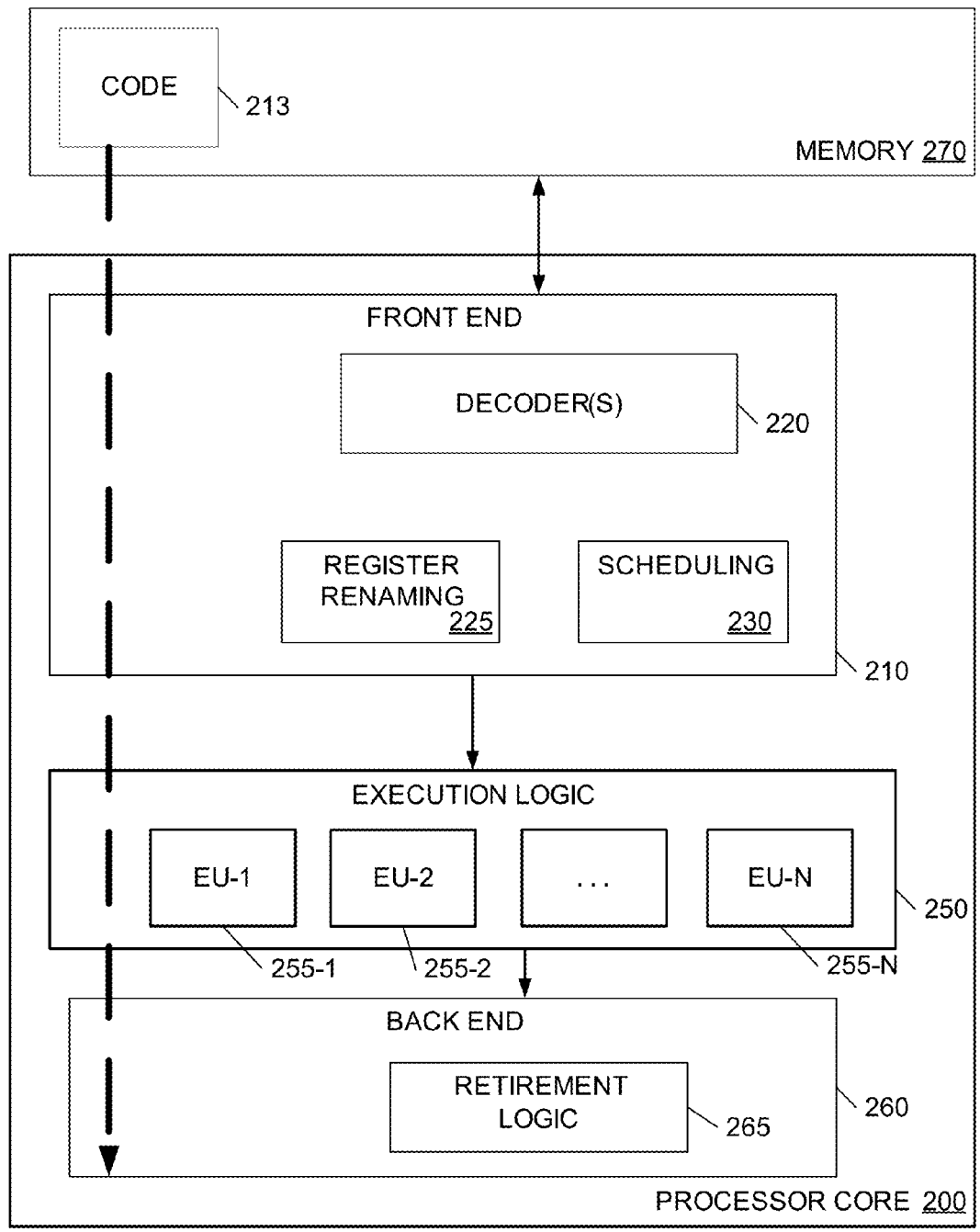
FIG. 4 is a block diagram of an example of a processor according to an embodiment.

Turning now to FIG. 1, a security module 11 of a computing platform 10 is shown in which a user 12 may obtain web content 14 (e.g., web pages, applications, multimedia, etc.) via a browser 16 (16a, 16b). The platform 10 may include, for example, a desktop computer, workstation, notebook computer, smart tablet, smart phone, personal digital assistant (PDA), media player, imaging device, etc., or any combination thereof. In the illustrated example, the browser 16 includes a core 16a and an HTML5 module 16b (e.g., web application compositor and/or compiler), wherein the security module 11 may include a runtime context interface 18 that is configured to monitor web application API (application programming interface) calls 17 made during the retrieval and presentation of the web content 14 to the user 12. Of particular note is that the web content 14 may have access to a plurality of platform data sources 22 by virtue of the web content 14 being written in a just in time (JIT) and/or runtime environment language such as HTML5 that exposes platform hardware. Moreover, the web content 14 may include malware and/or other unauthorized web applications. As will be discussed in greater detail, the contextual information obtained by the runtime context interface 18 may facilitate a more effective analysis of the security risks that may be posed by the web content 14. The illustrated security module 11 also includes a platform data aggregator 20 (20a-20c) configured to determine interaction information based on client device attributes (e.g., hardware attributes, operating system/OS attributes, software application attributes) of the platform data sources 22, wherein the interaction information may characterize interactions between the web content 14 and the platform data sources 22.

More particularly, the illustrated platform data aggregator 20 includes a sensor interface 20a that may obtain interaction information and/or client device attributes from sensors such as Wi-Fi sensors, global positioning system (GPS) sensors, cellular sensors, near field communications (NFC) sensors, audio sensors, motion sensors, and so forth. Thus, for example, if the web content 14 accesses a GPS sensor among the platform data sources 22 in order to determine the location of the platform, the sensor interface 20a may detect and document that interaction. The illustrated platform aggregator 20 also includes a hardware (HW) security reference 20b that may obtain interaction information and/or client device attributes from other hardware such as memory, input output (IO) components, processors, etc., of the platform data sources 22. For example, the IO components may include file system components, networking components, graphics components, and so forth, wherein if the web content 14 interacts with any of those IO components, such interaction may also be detected and documented by the HW security reference 20b. Additionally, the platform data aggregator 20 may include a user setting location 20c that stores various user security settings.

The illustrated security module 11, which may be implemented in an operating system (OS) and/or browser independent client application, plug-in, firmware, etc., also includes a data aggregator 24 that obtains interaction information (e.g., off-platform data) from remote data sources 26 such as peer-to-peer (P2P) applications, social networks, cloud services, enterprise databases, and so forth. For example, the remote data sources 26 may provide historical data as to the behavior of the web content 14 on other similar platforms. Thus, the interaction information obtained from the remote data sources 26 may also provide insight as to the security ramifications of presenting the web content 14 to the user 12 on the platform.

The security module 11 may also include a browser interface 28 that is configured to detect one or more web requests 30 for the web content 14, and poll/trigger a risk analyzer 32 for a risk profile/report 34 about the user action that led to the web requests 30. More particularly, the risk analyzer 32 may use the interaction information obtained by the platform data aggregator 20, the aggregator 24 of off-platform data and the runtime context interface 18 to generate the risk profile 34. The risk profile 34 may be presented to the user 12 via a graphical user interface (GUI) 36 and/or sent to a security control module 38 (e.g., digital rights management/DRM, enterprise rights management/ERM, client intrusion detection system/IDS, anti-virus solution, etc.) via a control interface 40, wherein the security control module 38 may be either on-platform or off-platform. More particularly, the control interface 40 may send the risk profile 34 to the security control module 38 in response to a control request from the security control module 38 and/or in response to a trigger condition (e.g., a threshold being met) associated with the risk profile 34. In one example, the delivery of the risk profile 34 to the user 12 and/or security control module 38 may occur in parallel with the presentation of the web content 14, depending upon user preferences.

Turning now to FIG. 2, a method 44 of managing web based security risks is shown. The method 44 may be implemented as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 44 may be written in any combination of one or more programming languages, including an object oriented programming language such as C++ or the like and conventional procedural programming languages, such as the "C" programming language or similar programming languages. Moreover, the method 44 may be implemented as the security module 11 (FIG. 1) using any of the aforementioned circuit technologies.

Illustrated processing block 46 provides for detecting a browser request for web content, wherein interaction information associated with a plurality of sources may be determined at block 48 in response to the browser request. As already noted, the plurality of sources may include, for example, platform sensors (e.g., Wi-Fi, GPS, cellular, NFC, audio, motion), platform memory, platform IO components (e.g., file system, networking, graphics), platform processors, platform runtime context interfaces, platform user setting locations, remote P2P applications, remote social networks, remote cloud services, remote enterprise databases, and so forth. Block 50 may involve generating a risk profile 50 based on the interaction information.

Turning now to FIG. 3, one example of the risk profile 34 is shown. In the illustrated example, the request web content is identified, as well as any interactions with platform components that may result from retrieval and/or presentation of the requested web content. Of particular note is that certain web applications such as JavaScript ("JS") applications may access sensitive user information by making function API calls (e.g., OS, native application, etc.) to various hardware components on the platform. The illustrated example detects and documents such calls and other interactions so that the user and/or security control modules may be made aware of them. The risk profile 34 may also include recommended actions (not shown). For example, if the information provided to the use indicates that certain web content has higher risk, the GUI 36 (FIG. 1) may enable the user to change browser security settings and/or enforce tighter policies (e.g., disallow JS from a particular web site, apply privacy controls, etc.). Thus, the recommended actions may include multiple alternatives. Indeed, the risk profile 34 may also highlight any privacy concerns associated with accessing certain personal information stored on the platform.

FIG. 4 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the security module 11 (FIG. 1), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 5:
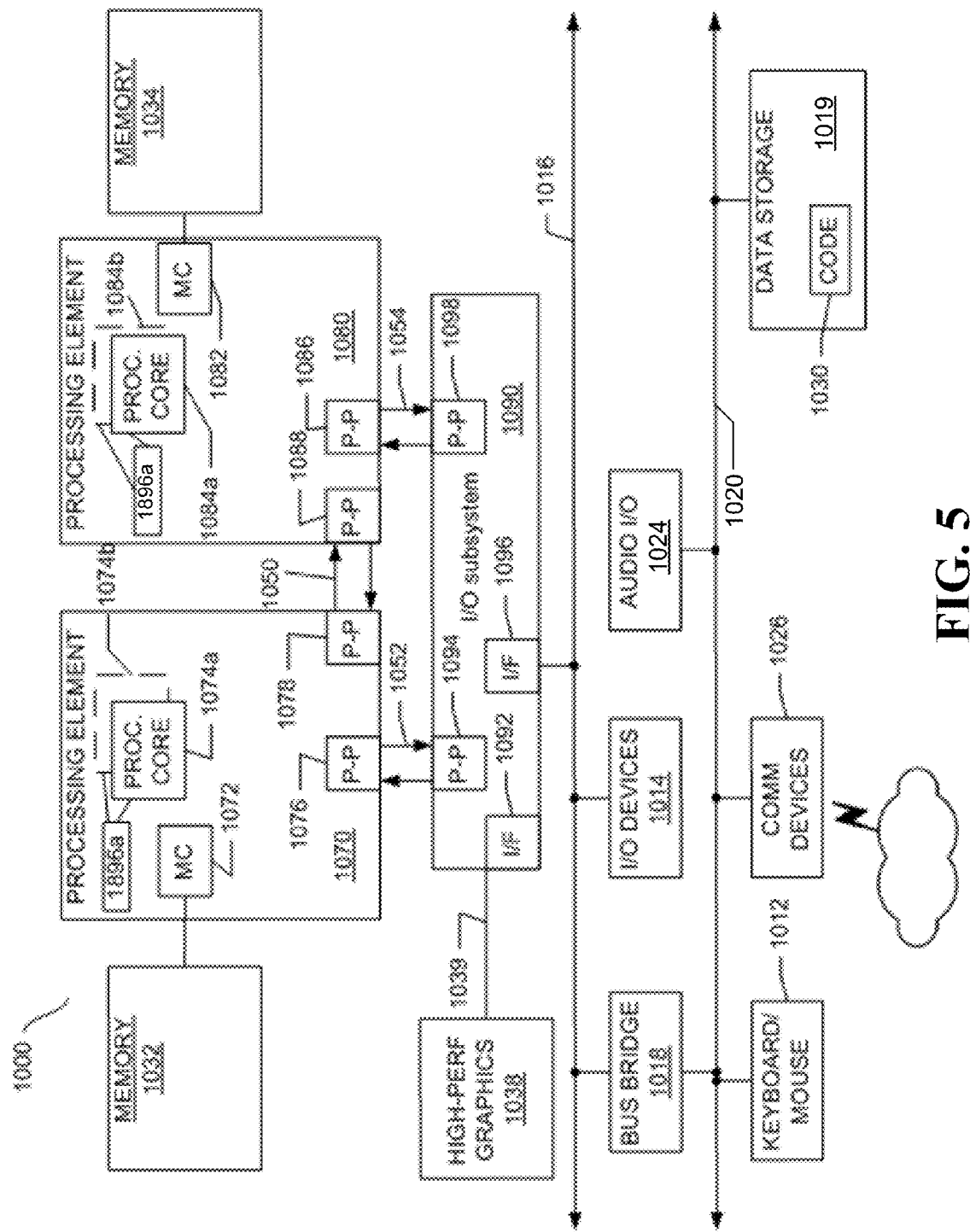
FIG. 5 is a block diagram of an example of a system according to an embodiment.

Referring now to FIG. 5, shown is a block diagram of a system 1000 in accordance with an embodiment. Shown in FIG. 5 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074*a* and 1074*b* and processor cores 1084*a* and 1084*b*). Such cores 1074, 1074*b*, 1084*a*, 1084*b* may be configured to execute instruction code in a manner similar to that discussed above in connection with FIG. 4.

Each processing element 1070, 1080 may include at least one shared cache 1896. The shared cache 1896*a*, 1896*b* may store data (e.g., instructions) that are utilized by one or more components of the processor, such as the cores 1074*a*, 1074*b* and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 5, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038 (e.g., graphics component). In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 5, various I/O devices 1014 may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (e.g., networking components, which may in turn be in communication with a computer network), and a data storage unit 1019 (e.g., file system component) such as a disk drive or other mass storage device which may include code 1030, in one embodiment. In one example, web content is received via the communication devices 1026. The code 1030 may include instructions for performing embodiments of one or more of the methods described above. Thus, the illustrated code 1030 may implement the security module 11 (FIG. 1) and may be similar to the code 213 (FIG. 4), already discussed. The data storage unit 1019, communication devices 1026, graphics engine 1038, etc. may therefore constitute IO components of the platform data sources 22 (FIG. 1), already discussed. Further, an audio I/O 1024 may be coupled to second bus 1020.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5.

ADDITIONAL NOTES AND EXAMPLES

Examples may include a computing and/or web based security platform having a plurality of hardware components. The plurality of hardware components may include one or more of a sensor, a network interface, a memory, an IO component and a processor. The platform may also have a browser interface to detect a browser request for web content. Additionally, the platform may have a security module to determine interaction information associated with the plurality of hardware components in response to the browser request and generate a risk profile based on the interaction information.

Additionally, the security module of the platform may include a first data aggregator to obtain the interaction information from one or more of the sensor, the memory, the IO component, the processor, a runtime context interface and a user setting location.

Additionally, the sensor of the platform may include one or more of a Wi-Fi sensor, a global positioning system (GPS) sensor, a cellular sensor, a near field communications (NFC) sensor, an audio sensor and a motion sensor.

Moreover, the IO component of the platform may include one or more of a file system component, a networking component and a graphics component.

In addition, the security module of the platform may include a second data aggregator to obtain the interaction information from one or more of a remote peer-to-peer (P2P) application, a remote social network, a remote cloud service and a remote enterprise database.

In addition, the security module of any of the aforementioned platform examples may include a graphical user interface (GUI), to present the risk profile to a user, wherein the risk profile is to include at least a portion of the interaction information and one or more recommended actions.

Moreover, the platform may include a control interface to send the risk profile to a security control module in response to one or more of a control request from the security control module and a trigger condition associated with the risk profile.

Examples may also include a web based security apparatus having a browser interface to detect a browser request for web content. Additionally, the apparatus may have a security module to determine interaction information associated with a plurality of sources in response to the browser request and generate a risk profile based on the interaction information.

Additionally, the security module of the apparatus may include a first data aggregator to obtain the interaction information from one or more of a platform sensor, a platform memory, a platform input output (IO) component, a platform processor, a platform runtime context interface and a platform user setting location.

Additionally, the first data aggregator of the apparatus may include a sensor interface to obtain the interaction information from one or more of a Wi-Fi sensor, a global positioning system (GPS) sensor, a cellular sensor, a near field communications (NFC) sensor, an audio sensor and a motion sensor.

Moreover, the first data aggregator of the apparatus may include an IO interface to obtain the interaction information from one or more of a file system component, a networking component and a graphics component.

In addition, the security module of the apparatus may include a second data aggregator to obtain the interaction information from one or more of a remote peer-to-peer (P2P) application, a remote social network, a remote cloud service and a remote enterprise database.

In addition, the security module of any of the aforementioned apparatus examples may include a graphical user interface (GUI), to present the risk profile to a user, wherein the risk profile is to include at least a portion of the interaction information and one or more recommended actions.

Moreover, the apparatus may further include a control interface to send the risk profile to a security control module in response to a control request from the security control module.

Additionally, the apparatus may further include a control interface to send the risk profile to a security control module in response to a trigger condition associated with the risk profile.

Examples may also include a method in which a browser request for web content is detected. The method may also provide for determining interaction information associated with a plurality of sources in response to the browse request, and generating a risk profile based on the interaction information.

Additionally, determining the interaction information may include obtaining the interaction information from one or more of a platform sensor, a platform memory, a platform input output (IO) component, a platform processor, a platform runtime context interface and a platform user setting location.

Additionally, obtaining the interaction information from the platform sensor may include obtaining the interaction information from one or more of a Wi-Fi sensor, a global positioning system (GPS) sensor, a cellular sensor, a near field communications (NFC) sensor, an audio sensor and a motion sensor.

Moreover, obtaining the interaction information from the platform IO component may include obtaining the interaction information from one or more of a file system component, a networking component and a graphics component.

In addition, determining the interaction information may include obtaining the interaction information from one or more of a remote peer-to-peer (P2P) application, a remote social network, a remote cloud service and a remote enterprise database.

In addition, any of the aforementioned method examples may further include presenting the risk profile to a user via a graphical user interface (GUI), wherein the risk profile includes at least a portion of the interaction information and one or more recommended actions.

Moreover, the method may further include sending the risk profile to a security control module in response to one or more of a control request from the security control module and a trigger condition associated with the risk profile.

Examples may also include at least one computer readable storage medium having a set of instructions which, if executed by a processor, cause a computer to detect a browser request for web content. The instructions, if executed, may also cause a computer to determine interaction information associated with a plurality of sources in response to the browser request, and generate a risk profile such as the risk profile 34 (FIG. 3) based on the interaction information.

In addition, the instructions, when executed by a processor, may cause a computer to perform any of the aforementioned method examples.

Examples may also include a web based security apparatus having means for performing any of the aforementioned method examples.

Technologies described herein may therefore include a method to manage web-based security in which accesses and frequency of accesses to hardware and other device attributes by languages such as HTML5 WebGL (Web Graphic Language), offline caching, and client code injection may be detected, logged, and reported to the end user as well as other security control mechanisms. Accordingly, security business intelligence (BI) may be achieved at both the end user level as well as the enterprise level. Simply put, a risk-aware web experience may be provided to users by aggregating security data from different sources and displaying a corresponding risk profile to the user. Meanwhile the techniques may also function as an analyzed data source for other client security controls.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing platform comprising:
   a plurality of hardware components including one or more of a sensor, a network interface, a memory, an input output (IO) component and a processor;
   a browser interface to detect a browser request that is to be issued from a browser of the platform for remote web content, wherein the web content is to be presented on the platform in response to the browser request; and
   a security module to:
      determine interaction information corresponding to an interaction between the web content and the plurality of hardware components to identify a risk associated with access by the web content to any hardware component of the plurality of hardware components in response to the browser request; and
      generate a risk profile based on the interaction information to document the risk associated with the access by the web content, wherein the risk profile is to include one or more pairings, each pairing of the one or more pairings to include a hardware component of the plurality of hardware components to be accessed by the web content in response to the browser request and an application associated with the web content that is to attempt access to the hardware component.

2. The platform of claim 1, wherein the security module includes a first data aggregator to obtain the interaction information from one or more of the sensor, the memory, the IO component, the processor, a runtime context interface and a user setting location.

3. The platform of claim 2, wherein the sensor includes one or more of a Wi-Fi sensor, a global positioning system (GPS) sensor, a cellular sensor, a near field communications (NFC) sensor, an audio sensor and a motion sensor.

4. The platform of claim 2, wherein the IO component includes one or more of a file system component, a networking component and a graphics component.

5. The platform of claim 1, wherein the security module includes a second data aggregator to obtain the interaction information from one or more of a remote peer-to-peer (P2P) application, a remote social network, a remote cloud service and a remote enterprise database.

6. The platform of claim 1, wherein the security module includes a graphical user interface (GUI) to present the risk profile to a user, wherein the risk profile is to present the one or more pairings and one or more recommended actions, each pairing of the one or more pairings to include an identity of a specific hardware component and an identity of a function call corresponding to the application that is to attempt access to the specific hardware component.

7. The platform of claim 1, further including a control interface to send the risk profile to a security control module in response to one or more of a control request from the security control module and a trigger condition associated with the risk profile.

8. An apparatus comprising:
 a browser interface to detect a browser request that is to be issued from a browser of a platform for remote web content, wherein the web content is to be presented on the platform in response to the browser request; and
 a security module to:
  determine interaction information corresponding to an interaction between the web content and a plurality of platform sources to identify a risk associated with access by the web content to any platform source of the plurality of platform sources in response to the browser request; and
  generate a risk profile based on the interaction information to document the risk associated with the access by the web content, wherein the risk profile is to include one or more pairings, each pairing of the one or more pairings to include a platform source of the plurality of platform sources to be accessed by the web content in response to the browser request and an application associated with the web content that is to attempt access to the platform source.

9. The apparatus of claim 8, wherein the security module includes a first data aggregator to obtain the interaction information from one or more of a platform sensor, a platform memory, a platform input output (IO) component, a platform processor, a platform runtime context interface and a platform user setting location.

10. The apparatus of claim 9, wherein the first data aggregator includes a sensor interface to obtain the interaction information from one or more of a Wi-Fi sensor, a global positioning system (GPS) sensor, a cellular sensor, a near field communications (NFC) sensor, an audio sensor and a motion sensor, wherein the risk is associated with access by the web content to one or more of the Wi-Fi sensor, the GPS sensor, the cellular sensor, the near NFC sensor, the audio sensor and the motion sensor.

11. The apparatus of claim 9, wherein the first data aggregator includes an IO interface to obtain the interaction information from one or more of a file system component, a networking component and a graphics component, wherein the risk is associated with access by the web content to one or more of the file system component, the networking component and the graphics component.

12. The apparatus of claim 8, wherein the security module includes a second data aggregator to obtain the interaction information from one or more of a remote peer-to-peer (P2P) application, a remote social network, a remote cloud service and a remote enterprise database, wherein the risk is based on historical data associated with behavior of the web content relative to one or more other platforms.

13. The apparatus of claim 8, wherein the security module includes a graphical user interface (GUI) to present the risk profile to a user, wherein the risk profile is to present the one or more pairings and one or more recommended actions, each pairing of the one or more pairings to include an identity of a specific platform source and an identity of a function call corresponding to the application that is to attempt access to the specific platform source.

14. The apparatus of claim 8, further including a control interface to send the risk profile to a security control module in response to a control request from the security control module, wherein the security control module is to one or more of control the access by the web content to the one or more plurality of platform sources, detect an intrusion, and detect malware.

15. The apparatus of claim 8, further including a control interface to send the risk profile to a security control module in response to a trigger condition associated with the risk profile, wherein the security control module is to one or more of control the access by the web content to the one or more plurality of platform sources, detect an intrusion, and detect malware.

16. At least one non-transitory computer readable storage medium comprising a set of instructions which, if executed by a processor, cause a computer to:
 detect a browser request that is to be issued from a browser of a platform for remote web content, wherein the web content is to be presented on the platform in response to the browser request;
 determine interaction information corresponding to an interaction between the web content and a plurality of platform sources to identify a risk associated with access by the web content to any platform source of the plurality of platform sources in response to the browser request; and
 generate a risk profile based on the interaction information to document the risk associated with the access by the web content, wherein the risk profile is to include one or more pairings, each pairing of the one or more pairings to include a platform source of the plurality of platform sources to be accessed by the web content in response to the browser request and an application associated with the web content that is to attempt access to the platform source.

17. The at least one computer readable storage medium of claim 16, wherein the instructions, if executed, cause a computer to obtain the interaction information from one or more of a platform sensor, a platform memory, a platform input output (IO) component, a platform processor, a platform runtime context interface and a platform user setting location.

18. The at least one computer readable storage medium of claim 17, wherein the instructions, if executed, cause a computer to obtain the interaction information from one or more of a Wi-Fi sensor, a global positioning system (GPS) sensor, a cellular sensor, a near field communications (NFC) sensor, an audio sensor and a motion sensor.

19. The at least one computer readable storage medium of claim 17, wherein the instructions, if executed, cause a computer to obtain the interaction information from one or more of a file system component, a networking component and a graphics component.

20. The at least one computer readable storage medium of claim 16, wherein the instructions, if executed, cause a computer to obtain the interaction information from one or more of a remote peer-to-peer (P2P) application, a remote social network, a remote cloud service and a remote enterprise database.

21. The at least one computer readable storage medium of claim 16, wherein the instructions, if executed, cause a computer to present the risk profile to a user via a graphical user interface (GUI), wherein the risk profile is to present the one or more pairings and one or more recommended actions, each pairing of the one or more pairings to include an identity of a specific platform source and an identity of a function call corresponding to the application that is to attempt access to the specific platform source.

22. The at least one computer readable storage medium of claim 16, wherein the instructions, if executed, cause a computer to send the risk profile to a security control module in response to a control request from the security control module.

23. The at least one computer readable storage medium of claim 16, wherein the instructions, if executed, cause a computer to send the risk profile to a security control module in response to a trigger condition associated with the risk profile.

24. The platform of claim 1, wherein the web content is to be written in one or more of a just in time (JIT) language and a runtime environment language that is to expose one or more of the plurality of hardware components, and wherein the runtime environment language is to include HyperText Markup Language 5 (HTML5).

* * * * *